F. E. ANNIS.
FRUIT PICKER.
APPLICATION FILED NOV. 4, 1913.
1,166,735.
Patented Jan. 4, 1916.
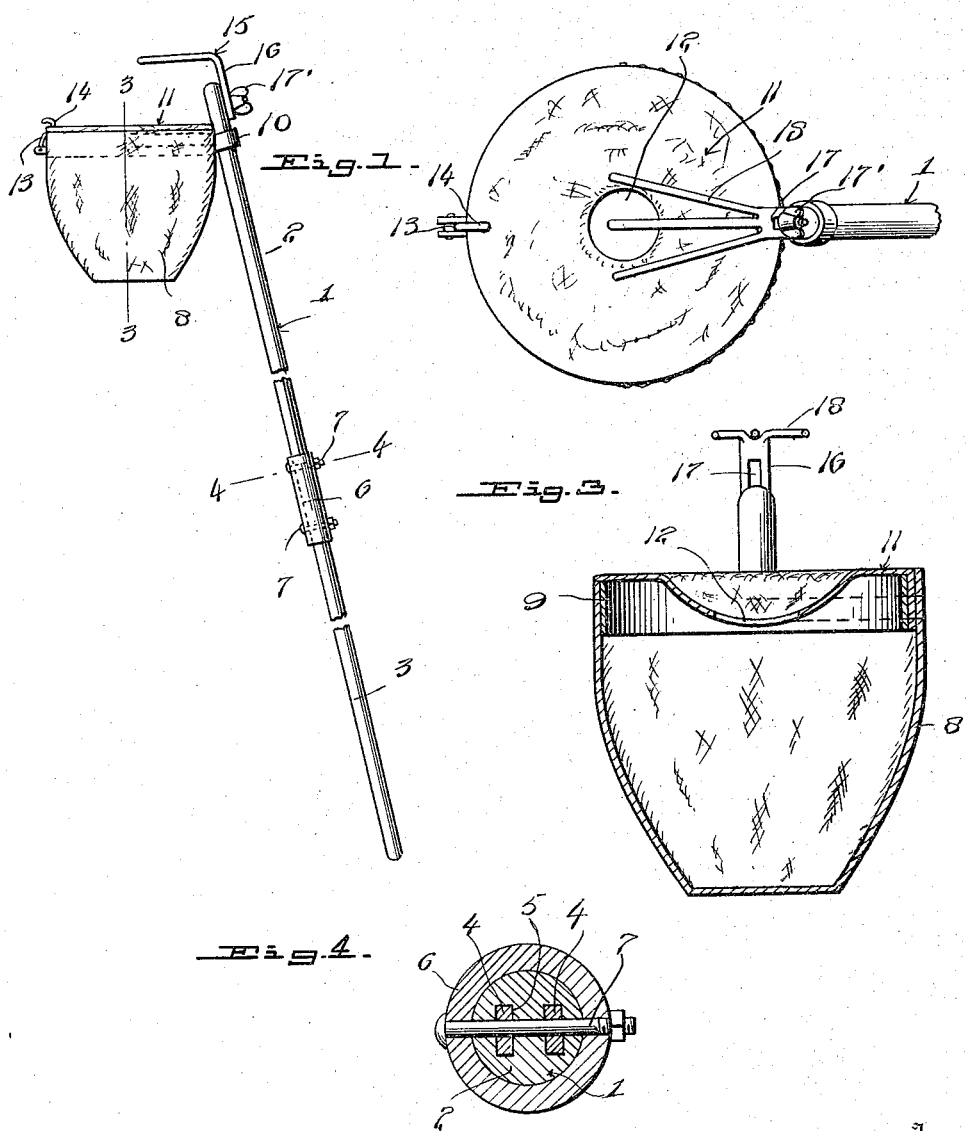
Inventor
F. E. Annis.
Witnesses
By
Attorneys

UNITED STATES PATENT OFFICE.

FERN E. ANNIS, OF MATTOON, ILLINOIS.

FRUIT-PICKER.

1,166,735.  Specification of Letters Patent.  Patented Jan. 4, 1916.

Application filed November 4, 1913. Serial No. 799,176.

*To all whom it may concern:*

Be it known that I, FERN E. ANNIS, a citizen of the United States, residing at Mattoon, in the county of Coles, State of Illinois, have invented certain new and useful Improvements in Fruit-Pickers; and I do hereby declare the following to be a full, clear, and exact description of the invention, such as will enable others skilled in the art to which it appertains to make and use the same.

The present invention is directed to fruit pickers, and has for its object to so construct a device of this character that the user can stand upon the ground and pick the growing fruit from a tree without the necessity of using a ladder.

A further object of the invention is to provide a device of this character which may be easily and quickly adjusted for picking fruit from trees of various height.

With these and other objects in view, this invention resides in the novel features of construction, formation, combination and arrangement of parts to be hereinafter more fully described, claimed and illustrated in the accompanying drawing, in which:—

Figure 1 is a side elevation of the device. Fig. 2 is a top plan view. Fig. 3 is a sectional view on line 3—3 of Fig. 1. Fig. 4 is a similar view on line 4—4 of Fig. 1.

Referring to the drawing, the numeral 1 designates a handle, which consists of sections 2 and 3, each of said sections being provided with reinforcing rods 4, which engage in the bores 5 of the adjacent section when the ends thereof are abutting. To hold the ends of the sections 2 and 3 in abutting relation, a sleeve 6 is passed thereover, and to the point where the sections abut, said sleeve being retained by bolts 7 which pass through the rods and sections.

The receptacle 8 is formed from canvas and has stitched to its upper edge a sheet metal hoop 9 which is provided with a ferrule 10 which engages the section 2 of the handle adjacent the upper end thereof, thus properly supporting the receptacle in relation to the handle. The cover 11 of the receptacle is provided with a central opening 12 for the passage of the fruit therethrough into the receptacle. The cover is stitched to the upper edge of the receptacle for half of its circumference, the remaining half being unattached so that it may be manipulated to permit the fruit to be emptied from the receptacle. Pivotally connected to the hoop 9, and directly opposite the ferrule 10 is a resilient latch 13, the bill 14 of which being adapted to engage one edge of the unattached portion of the cover to hold the same in binding engagement with the upper edge of the receptacle, thereby holding the cover properly. The cover is so formed as to be tapered in cross section so that the picked fruit will gravitate positively to the opening 12, and thence into the receptacle 8.

The picking fork 15 has its shank 16 provided with a slot 17 in which is engaged a thumb screw 17′, the inner end of which engages the section 2 of the handle adjacent the upper end thereof and is designed to hold the picking fork in adjusted positions so that the tines 18 may be held at different elevations from the top 11, whereby the drop of the picked fruit may be regulated.

From the foregoing description it will be seen that a fruit picker has been provided which can be elevated by the handle 1 so that the fruit stems may be easily engaged between the tines 18 of the picking fork and upon slight downward movement of the device, the picked fruit will pass into the receptacle 8. Further it will be noted that by forming the handle 1 in sections, sections of different length may be connected so as to adapt the device for use with trees of various height.

What is claimed is:—

In a fruit picker, the combination with a pole, of a receptacle secured to the upper end thereof, said receptacle including a rigid circular member extending outwardly from the pole, a flexible body portion encircling said circular member, a cover for said body portion secured thereto, throughout substantially half of the circumferential length of the same and a resilient clip for detachably securing the remainder of the cover to the circular member, the positively secured portion of the cover being adjacent the handle.

In testimony whereof, I affix my signature, in the presence of two witnesses.

FERN E. ANNIS.

Witnesses:
H. P. McNAIR,
J. STANLEY WEIS.

Copies of this patent may be obtained for five cents each, by addressing the "Commissioner of Patents, Washington, D. C."